United States Patent
Guo et al.

(10) Patent No.: US 9,667,683 B2
(45) Date of Patent: May 30, 2017

(54) SCALABLE ARCHITECTURE FOR MEDIA MIXING

(71) Applicant: Alcatel-Lucent USA Inc., Murray Hill, NJ (US)

(72) Inventors: Katherine H. Guo, Scotch Plains, NJ (US); Martin D. Carroll, Watchung, NJ (US); Ilija Hadzic, Millington, NJ (US); Krishan K. Sabnani, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 187 days.

(21) Appl. No.: 14/724,026

(22) Filed: May 28, 2015

(65) Prior Publication Data

US 2016/0352794 A1    Dec. 1, 2016

(51) Int. Cl.
*H04L 29/06* (2006.01)
*H04L 12/28* (2006.01)

(52) U.S. Cl.
CPC .................................. *H04L 65/601* (2013.01)

(58) Field of Classification Search
USPC ......................................... 709/219, 204, 227
See application file for complete search history.

(56) References Cited

U.S. PATENT DOCUMENTS

| | | | | |
|---|---|---|---|---|
| 8,204,042 | B2* | 6/2012 | Anschutz | H04L 65/1069 370/230 |
| 8,238,536 | B1* | 8/2012 | Kavulak | H04M 3/54 379/114.02 |
| 2003/0014488 | A1* | 1/2003 | Dalal | H04L 29/06 709/204 |
| 2005/0111467 | A1* | 5/2005 | Ng | H04L 29/06 370/401 |
| 2005/0232238 | A1* | 10/2005 | Oran | H04L 12/5695 370/352 |
| 2010/0034201 | A1* | 2/2010 | Barave | H04L 12/1822 370/389 |
| 2013/0100352 | A1 | 4/2013 | McGowan et al. | |
| 2015/0032857 | A1* | 1/2015 | Hamm | H04N 21/234327 709/219 |

* cited by examiner

*Primary Examiner* — Jude Jean Gilles
(74) *Attorney, Agent, or Firm* — Davidson Sheehan LLP

(57) ABSTRACT

A proxy mixer includes a transceiver configured to receive one or more first requests to provide one or more first media streams to one or more first endpoints. The one or more first media streams are generated by one or more second endpoints. The one or more first requests indicate one or more first quality metrics for the one or more first media streams. The transceiver is also configured to provide one or more second requests for the one or more second endpoints to generate the one or more first media streams at an aggregate quality metric that equals a highest quality metric of the one or more first quality metrics. The transceiver is further configured to transmit the one or more first media streams towards the one or more first endpoints.

20 Claims, 6 Drawing Sheets

SCALABLE ARCHITECTURE FOR MEDIA MIXING

BACKGROUND

Field of the Disclosure

The present disclosure relates generally to network communication and, more particularly, to mixing media streams in network communication.

Description of the Related Art

Communication networks that support media applications such as videoconferencing can include a central mixer that receives video streams provided by the participants in the videoconference. The mixer may also be referred to as a video mixing component, a video mixer, a media mixer, or a multipoint control unit. The mixer generates a composited video stream for each participant using the video streams received from the participants. The composited video stream for each participant is formed from the input video streams from the other participants since it is not necessary for participants to view themselves. The composited video stream is then provided to the corresponding participant for display by an end-user device, which may be referred to as an endpoint. Portions of the composited video stream can be displayed in different areas of a display screen at the endpoint. For example, a participant that is speaking can be emphasized by displaying the video stream showing the speaker in a large area of the display screen while displaying video streams showing the other participants in smaller areas of the display screen. Alternatively, a participant can directly receive video streams from the other participants and then display the multiple decoded video streams in different portions of the display screen without mixing the video streams.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for implementing a scalable architecture for media mixing. The method includes receiving, at a first proxy mixer, at one or more first requests to provide one or more first media streams to one or more first endpoints. The one or more first media streams are generated by one or more second endpoints. The one or more first requests indicate one or more first quality metrics for the one or more first media streams. The method also includes providing, from the first proxy mixer, one or more second requests for the one or more second endpoints to generate the one or more first media streams at an aggregate quality metric that equals a highest quality metric of the one or more first quality metrics. The method further includes transmitting, from the first proxy mixer, the one or more first media streams towards the one or more first endpoints.

In some embodiments, an apparatus is provided for a scalable architecture for media mixing. The apparatus includes a transceiver configured to receive one or more first requests to provide one or more first media streams to one or more first endpoints. The one or more first media streams are generated by one or more second endpoints. The one or more first requests indicate one or more first quality metrics for the one or more first media streams. The transceiver is also configured to provide one or more second requests for the one or more second endpoints to generate the one or more first media streams at an aggregate quality metric that equals a highest quality metric of the one or more first quality metrics. The transceiver is further configured to transmit the one or more first media streams towards the one or more first endpoints.

In some embodiments, a method is provided for implementing endpoints in a scalable architecture for media mixing. The method includes providing, from a first endpoint, a first request for a first proxy mixer to provide one or more first media streams. The request indicates one or more first quality metrics for the one or more first media streams. The one or more first media streams are generated by one or more second endpoints. The method also includes receiving, at the first endpoint, the one or more first media streams from the first proxy mixer at the one or more first quality metrics in response to providing the first request.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
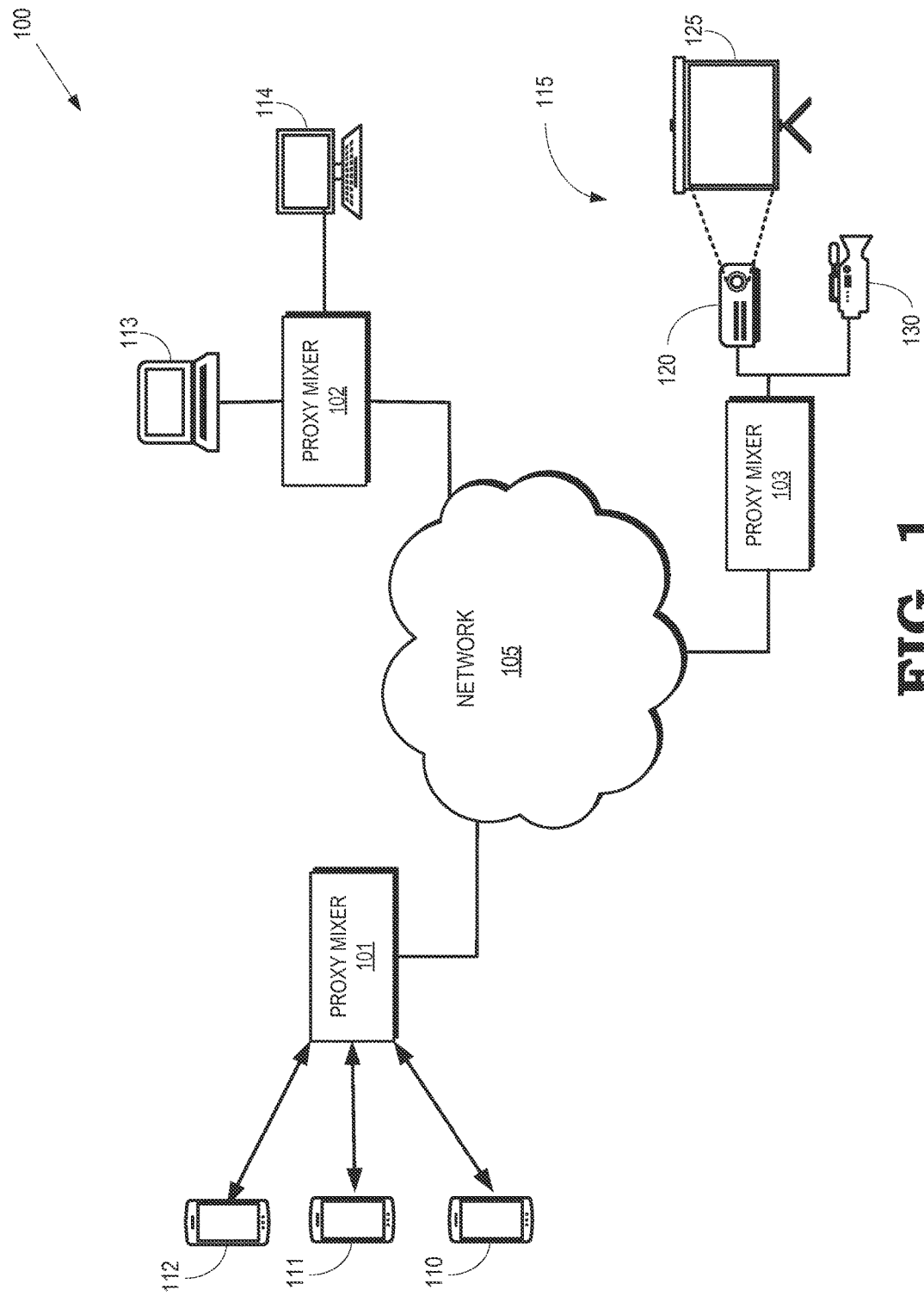
FIG. 1 is a block diagram of a communication system according to some embodiments.

The perceived quality of video displayed by the participants in a videoconference may change significantly depending on the size of the display implemented at different endpoints and the area of the display allocated for showing different video streams. For example, a participant may perceive a relatively high quality when a video stream is displayed on a small screen (e.g., the touchscreen of a smart phone) and the participant may perceive a relatively low quality when the same video stream is displayed on a large screen (e.g., a tiled composition of monitors or a projection screen). For another example, a participant may perceive a decrease in the quality of a video stream when it is displayed in the large area reserved for speakers and an increase in the quality of the video stream when it is displayed in the smaller areas reserved for listeners. Furthermore, providing the same video stream to endpoints that utilize different display areas may consume an unnecessarily large bandwidth (if the video stream is encoded to provide high image quality within a display area that is larger than the actual display area) or result in a low perceived user quality (if the video stream is encoded to provide high image quality within a display area that is smaller than the actual display area).

The competing demands for low bandwidth usage and high perceived image quality in videoconferences can be balanced using a proxy mixer to provide composite video streams to endpoints associated with a subset of participants in the conference. The endpoints send requests to their associated proxy mixer for video streams to be provided at quality levels indicated by quality metrics selected at the endpoints. The endpoints may select the quality metrics based on a display area to be used for the stream, an available bandwidth for conveying the stream, or any other criteria. The quality metrics may also be selected dynamically, e.g., in response to changing display areas associated with speakers and listeners in the videoconference. The proxy mixer determines an aggregate quality metric for each video stream. The aggregate quality metric represents the maximum quality metric requested by any of the proxy mixer's associated endpoints. In some embodiments, the proxy mixer may also receive requests for video streams from other proxy mixers, in which case the aggregate quality metric may also reflect the quality metrics requested by the other proxy mixers. The proxy mixer can then transmit a request for the video streams at the aggregate quality metrics. The request can be transmitted to other endpoints or to other proxy mixers in a distributed architecture.

Proxy mixers also receive requests for video streams at aggregate quality metrics from other proxy mixers or endpoints and provide requests for the video streams to its associated endpoints, which may then generate video streams using the highest quality specified in the requests received by the associated proxy mixers. If the endpoint is not able to produce video quality equal or higher than the highest quality requested, it generates the highest quality it can produce. The proxy mixer receives the video streams encoded at the aggregate quality metrics and then generates composite video streams for its associated endpoints (or other proxy mixers) based on the requested quality metrics. Some embodiments of the proxy mixer include a transcoder to transcode video streams from an aggregate quality metric to a requested quality metric. Proxy mixers in a distributed architecture may be interconnected in a mesh topology or a tree hierarchy.

FIG. 1 is a block diagram of a communication system 100 according to some embodiments. The communication system 100 includes one or more proxy mixers 101, 102, 103 that may be referred to collectively as "the proxy mixers 101-103." The proxy mixers 101-103 are interconnected by a network 105, which may include wired or wireless connections that operate according to the relevant standards or protocols. The proxy mixers 101-103 are also connected to one or more endpoints 110, 111, 112, 113, 114, 115 that may be referred to collectively as "the endpoints 110-115." The endpoints 110-115 may include different types of devices or user equipment. For example, the proxy mixer 101 is connected to the endpoints 110-112, which may be smart phones or other wireless devices that have a wireless connection to the proxy mixer 101. The proxy mixer 102 is connected to the endpoints 113, 114, which may include a laptop computer 113 and a desktop computer 114 that have a wired connection to the proxy mixer 102. The proxy mixer 103 is connected to the endpoint 115, which may include a projector 120, a display screen 125, and a video camera 130. Some embodiments may include any number of proxy mixers 101-103 or endpoints 110-115, which may include any type of endpoint device capable of providing a media stream and playing a received media stream.

The endpoints 110-115 are capable of generating media streams and playing or displaying the media represented by media streams. As used herein, the phrase "media stream" refers to data representative of audio, video, other multimedia information, or any combination thereof that can be transmitted through the communication system 100 and used to render the corresponding audio, video, other multimedia programming, or combination thereof at a user device such as the endpoints 110-115. The endpoints 110-115 may therefore include or be associated with microphones, cameras, speakers, displays, or other software, firmware, or hardware used to generate or play out media streams. For example, the endpoint 115 includes the projector 120 for projecting video onto the display screen 125. The endpoint 115 may also include speakers for playing audio. The endpoint 115 also includes the video camera 130 for capturing video (and audio, in some cases) that can be converted into a media stream for transmission through the network 105, as discussed herein.

The endpoints 110-115 generate media streams and play/display the media represented by the media streams at different quality levels. The quality of a media stream is determined by the encoding process that the endpoints 110-115 use to encode the media stream for transmission over the network 105. The quality level of the media stream may therefore be adjusted by adjusting the codec or the parameters within the codec used by the endpoints 110-115 to encode the media. For example, the quality of a video stream may be indicated by a frame size of each video frame (e.g., as measured in terms of width by height in pixels) and the average bit rate (e.g., as measured in bits per second) of the video stream generated by an encoder in the endpoints 110-115. For a fixed encoding process, a smaller frame size results in a video stream with a smaller average bit rate. The video quality may therefore be indicated by a quality metric defined as the average bit rate per unit area in terms of pixels. The quality metric is calculated as the average bit rate divided by the frame size of the corresponding video frame. If the encoder uses a fixed frame size, the quality metric is equivalent to the average bit rate of the encoded video stream. Quality metrics may also be defined for other types of media such as audio or multimedia.

The endpoints 110-115 can individually request different quality metrics for each media stream that is to be played or displayed by the endpoint 110-115. The quality metrics may be selected based upon the display size or screen size allocated to an application that will use the media stream. For example, the endpoints 110-112 may request video streams at quality metrics that are lower than the quality metrics requested by the endpoints 113, 114 because the displays at the endpoints 110-112 are smaller than the displays at the endpoints 113, 114. For another example, the endpoint 115 may request video streams at quality metrics that are higher than the quality metrics requested by the endpoints 113, 114 because the display 125 at the endpoint 115 is larger than the displays at the endpoints 113, 114. For yet another example, the endpoint 110 may implement a videoconferencing application that changes the display size of different participants depending on whether they are currently speaking or not. A participant that is speaking is displayed in a larger image and consequently the endpoint 110 may request a video stream from the speaker's endpoint at a higher quality metric. Participants that are listening are displayed in smaller images and consequently the endpoint 110 may request video streams for the listeners' endpoints at lower quality metrics. Quality metrics may also be selected based on other criteria such as network conditions, available bandwidth, latency, and the like.

The endpoints 110-115 generate media streams at different quality levels indicated by different quality metrics. For example, the endpoint 110 may generate a media stream at a quality level corresponding to a quality metric indicated in a request from one of the other endpoints 111-115. However, more than one of the other endpoints 111-115 may request a media stream from the endpoint 110 and the other endpoints 111-115 may request media streams at different quality metrics. Thus, not all of the endpoints 111-115 may request the same quality metric for the same media stream. The proxy mixers 101-103 may therefore receive requests from the endpoints 110-115 (or other proxy mixers 101-103) for media streams at different quality levels and use these requests to generate an aggregate quality metric (AQM) for each media stream based on the requested quality metrics (QMi). The aggregate quality metric may be defined as the maximum of the requested quality metrics for the media stream:

$$AQM = \max_i QM_i$$

The aggregate quality metric therefore represents the highest quality level that has been requested for the media stream by any of the requesting endpoints 110-115.

Proxy mixers 101-103 can calculate aggregate quality metrics based on quality metrics requested by the endpoints 110-115 or other aggregate quality metrics requested by other proxy mixers 101-103. The aggregate quality metric generated by a proxy mixer 101-103 based on received quality metrics or other aggregate quality metrics may be referred to as a "net aggregate quality metric" of the proxy mixer 101-103. For example, if the endpoints 110-115 are participating in a videoconference, the endpoints 111, 112 may send requests to the proxy mixer 101 for a video stream generated by the endpoint 110. The requests may indicate corresponding quality metrics, which may or may not be the same. The proxy mixer 101 may also receive requests from the proxy mixers 102, 103 for the video stream generated by the endpoint 110. The requests from the proxy mixers 102, 103 may indicate aggregate quality metrics (which may or may not be the same) for corresponding requests from the endpoints 113-115 for the video stream generated by the endpoint 110. The proxy mixer 101 generates a net aggregate quality metric based on the requested quality metrics or aggregate quality metrics and then transmits a request to the endpoint 110 to generate the video stream at the net aggregate quality metric. The endpoint 110 may then capture the video and encode the video stream at the quality level indicated by the net aggregate quality metric received from the proxy mixer 101. The proxy mixer 101 provides the video streams to the requesting endpoints 111, 112 at the requested quality metrics and to the proxy mixers 102, 103 at the requested aggregate quality metrics. As discussed herein, transcoding may be used to reduce the quality level from the level indicated by the net aggregate quality metric to lower levels indicated by the quality metrics requested by the endpoints 111, 112 or the aggregate quality metrics requested by the proxy mixers 102, 103.

Figure 2:
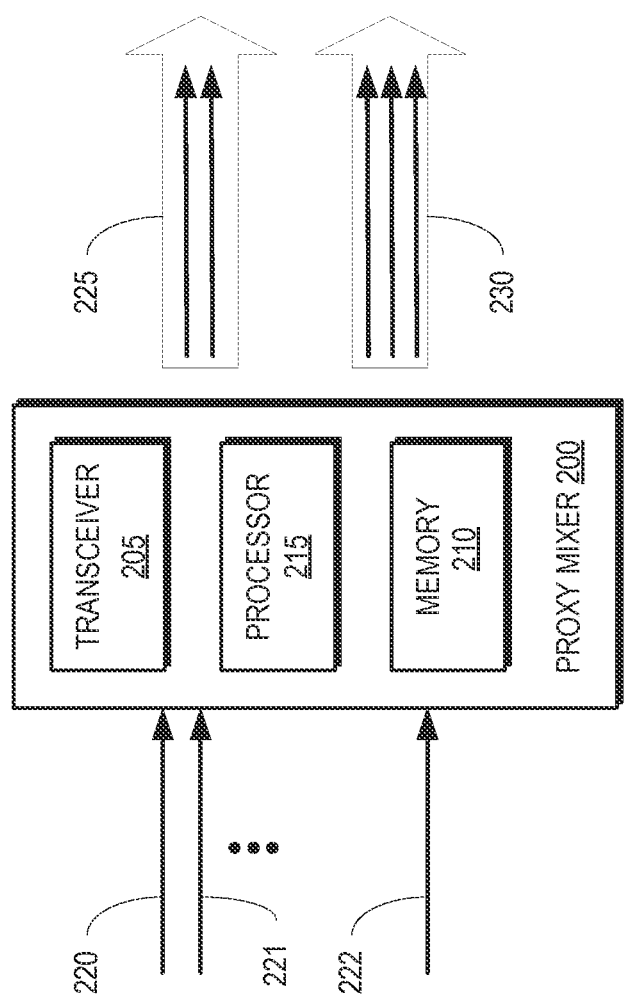
FIG. 2 is a block diagram of a proxy mixer that receives media streams then generates composite media streams according to some embodiments.

FIG. 2 is a block diagram of a proxy mixer 200 that receives media streams then generates composite media streams according to some embodiments. The proxy mixer 200 may be used to implement some embodiments of the proxy mixers 101-103 shown in FIG. 1. The proxy mixer 200 includes a transceiver 205 that may transmit or receive messages or signals including requests for media streams, media streams, or composite media streams, as discussed herein. The proxy mixer 200 includes memory 210 for storing information such as processor instructions, data for transmission, received data, and the like. A processor 215 may be used to process information for transmission, process received information, or perform other operations as discussed herein, e.g., by executing instructions stored in the memory 210.

Some embodiments of the proxy mixer 200 receive one or more media streams 220, 221, 222 (also referred to collectively as "the media streams 220-222") that were generated or encoded at a requested quality metric by one or more endpoints such as the endpoints 110-115 shown in FIG. 1. The media streams 220-222 may include individual media streams (also referred to as "local feeds" or "local streams") provided by individual endpoints that are associated with the proxy mixer 200. Some embodiments of the proxy mixer 200 may form a composite stream using the local feeds provided by each of its associated endpoints. This composite stream may be referred to as a "local composition." The media streams 220-222 may also include individual media streams or composite media streams provided by other proxy mixers. The individual or composite media streams may be referred to as "partial compositions."

The proxy mixer 200 uses the media streams 220-222 to form composite streams 225, 230 that include media streams requested by other endpoints or proxy mixers. The composite streams 225, 230 provided to an endpoint by a proxy mixer may be referred to as "complete compositions." The proxy mixer 200 may receive requests for complete compositions from endpoints associated with the proxy mixer 200, endpoints associated with other proxy mixers, or other proxy mixers. The proxy mixer 200 may also provide the composite streams 225, 230 to the requesting endpoints or proxy mixers. In some embodiments, the quality metric requested by a subset of the endpoints or proxy mixers for the media streams 220-222 may be lower than the aggregate quality metric that was used to generate or encode the media streams 220-222 at the originating endpoint or proxy mixer. The proxy mixer 200 may therefore implement transcoding functionality to transcode one or more of the media streams 220-222 from the aggregate quality metric to the quality metrics requested by the subsets of the endpoints or proxy mixers. The transcoded media streams 220-222 may then be used to form the composite streams 225, 230 provided to the subset.

Compositions of streams, including partial compositions and complete compositions, contain a mixture of two or more media streams 220-222 that are formed into a single media stream and can only be transmitted as a single media stream. It may be difficult or impossible to extract individual media streams from a composition for processing of the individual media streams. For example, transcoding can only be applied to a composition and not to individual media streams that were used to form the composition. For another example, endpoints may not be able to remove individual media streams from a composition received by the endpoint. For yet another example, if an endpoint wants to receive a media stream with a lower quality than the quality used to form the composition, the endpoint may need to reduce the quality of the entire composition and not just the individual media stream.

Some embodiments of the proxy mixer 200 may be configured to implement "last stage mixing." In embodiments that implement last stage mixing, the proxy mixer 200 only forms composite streams for its associated endpoints using the media streams 220-222. The proxy mixer 200 may perform transcoding of the media streams 220-222 to adjust the quality metric of the media streams 220-222 to the quality level requested by its associated endpoints, as necessary. The proxy mixer 200 may not compose the media streams 220-222 into partial compositions for provision to other proxy mixers so that the other proxy mixers can select (and transcode, if necessary) the media streams 220-222 for provision to their associated endpoints.

Some embodiments of the proxy mixer 200 may be configured to implement "early stage mixing." In embodiments that implement early stage mixing, the proxy mixer 200 forms composite streams for its associated endpoints and for one or more other proxy mixers that have requested the media streams 220-222. Early-stage mixing may be easier to implement but may reduce the flexibility of the communication system. Some embodiments of communication systems that implement the proxy mixer 200 may implement combinations of early-stage mixing and late stage mixing, e.g., to balance competing demands for simplicity, flexibility, and bandwidth.

Figure 3:
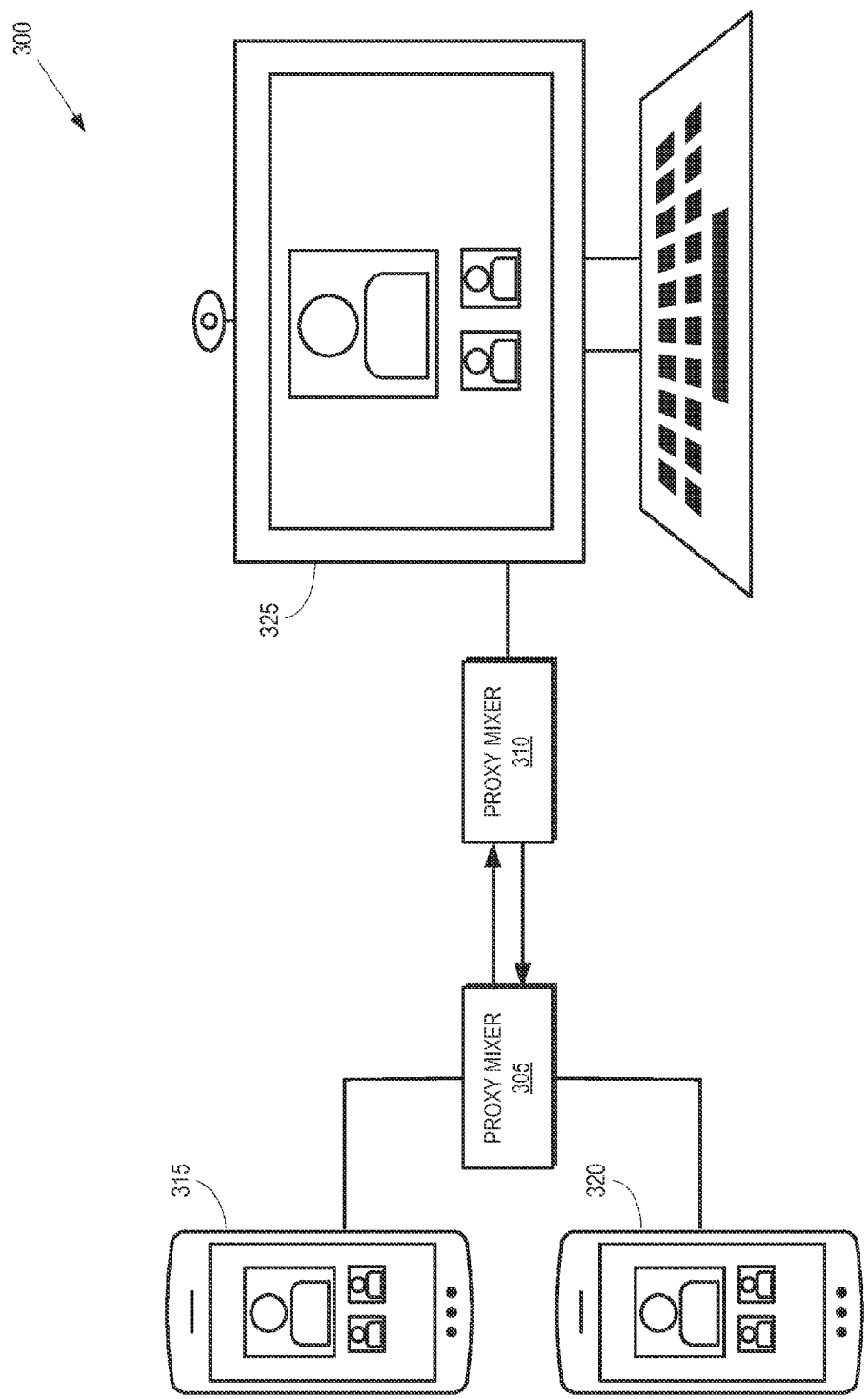
FIG. 3 is a block diagram of a communication system according to some embodiments.

FIG. 3 is a block diagram of a communication system 300 according to some embodiments. The communication system 300 includes proxy mixers 305, 310 that are connected to endpoints 315, 320, 325, respectively. The endpoints 315, 320, 325 are participating in a videoconference and thus the displays of the endpoints 315, 320, 325 are each displaying images of the three participants associated with the endpoints 315, 320, 325. In some embodiments, the area of the displayed images is determined based on whether the participant is speaking or listening so that the speaker is displayed in a relatively large area and the listeners are displayed in relatively small areas. Although three images are shown on the displays of the endpoints 315, 320, 325, some embodiments may bypass displaying the image of the participant on the participant's own endpoint device. The area of the displayed images therefore depends on the display area of the endpoints 315, 320, 325 and whether or not a participant is speaking.

The endpoints 315, 320, 325 dynamically request quality metrics for the media streams provided by the other endpoints 315, 320, 325. For example, the endpoints 315, 320 may request a higher quality metric for the media stream generated by the endpoint 325 when the participant at the endpoint 325 is speaking The endpoints 315, 320 may subsequently modify the requested quality metric for the media stream from the endpoint 325 when the participant at the endpoint 325 stops speaking and the participant at another endpoint 315, 320 begins speaking In response to dynamic requests from the endpoints 315, 320, 325, the proxy mixers 305, 310 may dynamically modify the requested quality metrics or aggregate quality metrics that are transmitted to the other proxy mixer 305, 310 or their associated endpoints 315, 320, 325. For example, the proxy mixer 305 may modify the aggregate quality metric in a request sent to the proxy mixer 310 for a media stream generated by the endpoint 325 in response to changes in the quality metrics requested by one or more of the endpoints 315, 320. The proxy mixers 305, 310 may also modify transcoding of received media streams or composite media streams in response to changes in quality metrics or aggregate quality metrics so that the received media streams or composite media streams can be transcoded from the (possibly modified) aggregate quality metric to the (possibly modified) quality metrics indicated by requests from the endpoints 315, 320, 325.

Figure 4:
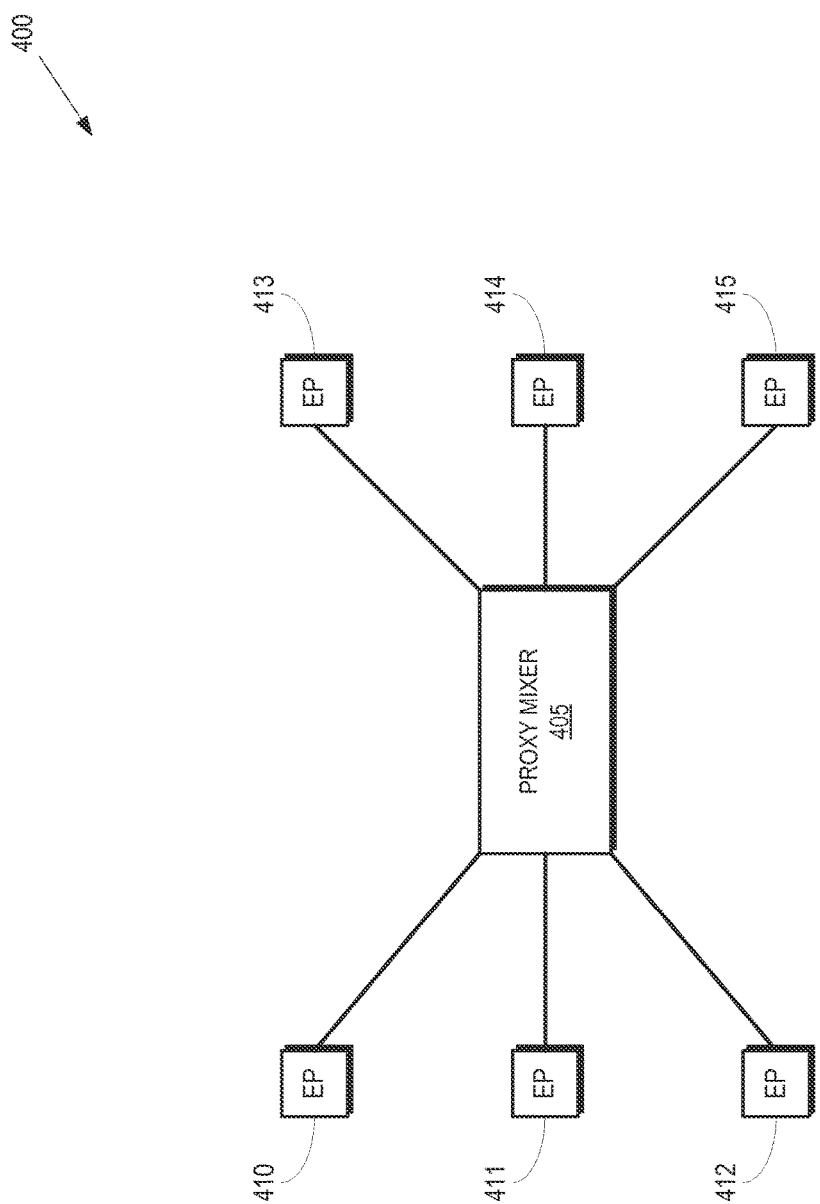
FIG. 4 is a block diagram of a communication system that includes a single proxy mixer according to some embodiments.

FIG. 4 is a block diagram of a communication system 400 that includes a single proxy mixer 405 according to some embodiments. The proxy mixer 405 is associated with a plurality of endpoints (EP) 410, 411, 412, 413, 414, 415 (collectively referred to herein as "the endpoints 410-415") that can generate media streams and display or play out received media streams or composite streams. The proxy mixer 405 can receive requests for media streams from one or more of the endpoints 410-415. The requests include indications of quality metrics for the media streams requested by the endpoints 410-415. For example, if the endpoints 410-415 are participating in a videoconference, each of the endpoints 410-415 may send requests to the proxy mixer 405 for composite streams formed using the video feeds provided by the other endpoints 410-415. The requests indicate the different quality metrics for each video feed requested by each of the endpoints 410-415. As discussed herein, the endpoints 410-415 may request different quality metrics for different video feeds and so the proxy mixer 405 may generate an aggregate quality metric that is used to request a video feed from each of the endpoints 410-415.

The proxy mixer 405 combines the video feeds received from each of the endpoints 410-415 to form composite streams for each of the endpoints 410-415. The composite streams include the video feeds requested by the corresponding endpoints 410-415 at the requested quality metrics. Not all of the endpoints 410-415 may have requested each video feed at the same quality metric and so the proxy mixer 405 may transcode the video feeds from the aggregate quality metric to the quality metrics requested by the endpoints 410-415. The transcoded video feeds may then be incorporated into the corresponding composite stream before the proxy mixer 405 provides the composite stream to the endpoints 410-415.

Figure 5:
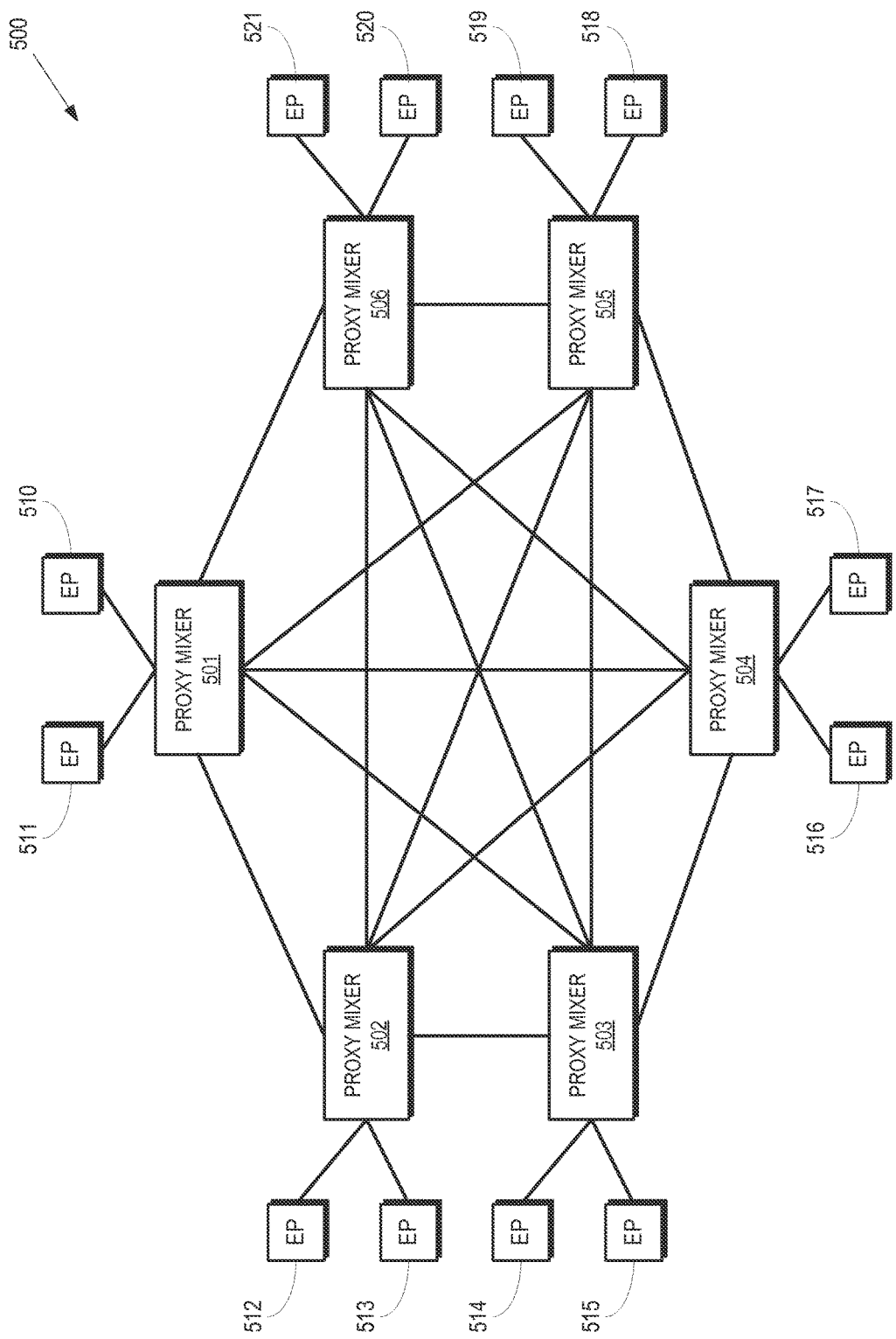
FIG. 5 is a block diagram of a communication system that includes proxy mixers interconnected in a mesh topology according to some embodiments.

FIG. 5 is a block diagram of a communication system 500 that includes proxy mixers interconnected in a mesh topology according to some embodiments. Each of the proxy mixers 501, 502, 503, 504, 505, 506 (referred to collectively as "the proxy mixers 501-506") is connected to each of the other proxy mixers 501-506 by a wired or wireless communication connection to form a mesh topology. The proxy mixers 501-506 are associated with endpoints (EP) 510, 511, 512, 513, 514, 515, 516, 517, 518, 519, 520, 521 (collectively referred to herein as "the endpoints 510-521"). As discussed herein, each proxy mixer 501-506 receives requests for media streams from its associated endpoints 510-521 or the other proxy mixers 501-506. The proxy mixers 501-506 may then provide requests for the media streams (including aggregate quality metrics) to the other proxy mixers 501-506 or endpoints 510-521. For example, the proxy mixer 501 may receive requests (including requested quality metrics) from the endpoint 510 for media streams generated by the endpoints 511-521. The proxy mixer 501 may also receive requests (including aggregate quality metrics) from the proxy mixers 502-506 for media streams generated by the endpoints 510-511.

The proxy mixers 501-506 may then use the information in the received requests, such as the quality metrics or aggregate quality metrics associated with each requested media stream, to generate requests for media streams. For example, the proxy mixer 501 may generate an aggregate quality metric for a request for a media stream generated by the endpoint 510 by combining the quality metric received from the endpoint 511 in a request for the media stream generated by the endpoint 510 with the aggregate quality metrics received from the proxy mixers 502-506 in other requests for the media stream generated by the endpoint 510. For another example, the proxy mixer 501 may generate an aggregate quality metric for a request for a media stream generated by the endpoint 516 by combining quality metrics in requests from the endpoints 510, 511 for the media stream generated by the endpoint 516. The proxy mixer 501 may then send the request for the media stream (including the aggregate quality metric) to the proxy mixer 504 associated with the endpoint 516.

The proxy mixers 501-506 can combine the media streams received from endpoints 510-521 or composite streams received from other proxy mixers 501-506 to form composite streams that are provided to endpoints 510-521 or proxy mixers 501-506. For example, the proxy mixer 501 may combine a media stream generated by the endpoint 510 with a media stream generated by the endpoint 511 to form composite streams that are provided to the proxy mixers 502-506. For another example, the proxy mixer 501 may generate composite streams including the media streams requested by the endpoints 510, 511. The composite streams may be formed by selectively combining media streams or composite streams received from the proxy mixers 502-506 based on the request received from the endpoints 510, 511. In some embodiments, the proxy mixers 501-506 may not combine media streams into composite streams and may instead provide the individual media streams to the other proxy mixers 501-506. The received media streams or composite streams may be selectively transcoded to the quality metrics requested by the endpoints 510, 511.

Some embodiments of the communication system 500 may employ last-stage mixing so that the proxy mixers 501-506 apply transcoding to the media streams received from their associated endpoints 510-521 to match the requested aggregate quality metrics of the other proxy mixers 501-506. The transcoded media streams are then sent individually to the other proxy mixers 501-506, which may perform additional transcoding to the media streams in order to fit the requested quality metrics of the associated endpoints 510-521. Once each individual media stream reaches the destination proxy mixer 501-506 associated with one or more requesting endpoints 510-521, the destination proxy mixer 501-506 transcodes the individual media streams to satisfy the quality metrics of the destination endpoints 510-521 and then applies video mixing to generate a complete composition for each destination endpoint 510-521.

Some embodiments of the communication system 500 may employ early-stage mixing so that the proxy mixers 501-506 apply transcoding to the media streams received from their associated endpoints 510-521 to match the requested aggregate quality metrics of the other proxy mixers 501-506. The proxy mixers 501-506 combine the media streams to form local composite streams, which are then sent to the other proxy mixers 501-506. The local composite streams may be transcoded at the destination proxy mixers 501-506 in order to fit the requested quality metrics of the associated endpoints 510-521. Each destination proxy mixer 501-506 combines the transcoded local composite streams received from the other proxy mixers 501-506 to provide complete compositions to its associated endpoints 510-521.

The mesh topology of the communication system 500 may advantageously reduce (e.g., relative to a hierarchical topology such as the topology of the communication system 600 discussed in FIG. 6 below) the latency for communication between the proxy mixers 501-506 because there is only a single hop between any two of the proxy mixers 501-506. As used herein, the term "hop" refers to a portion of the communication system 500 between entities that encode or decode a media stream. For example, the portion of the communication system 500 between the proxy mixer 502 and the proxy mixer 503 is a hop. However, the mesh topology of the communication system 500 may not be scalable to large numbers of proxy mixers 501-506 because of the large number of interconnections, which scales as $N*(N-1)/2$ with the number (N) of proxy mixers 501-506.

Figure 6:
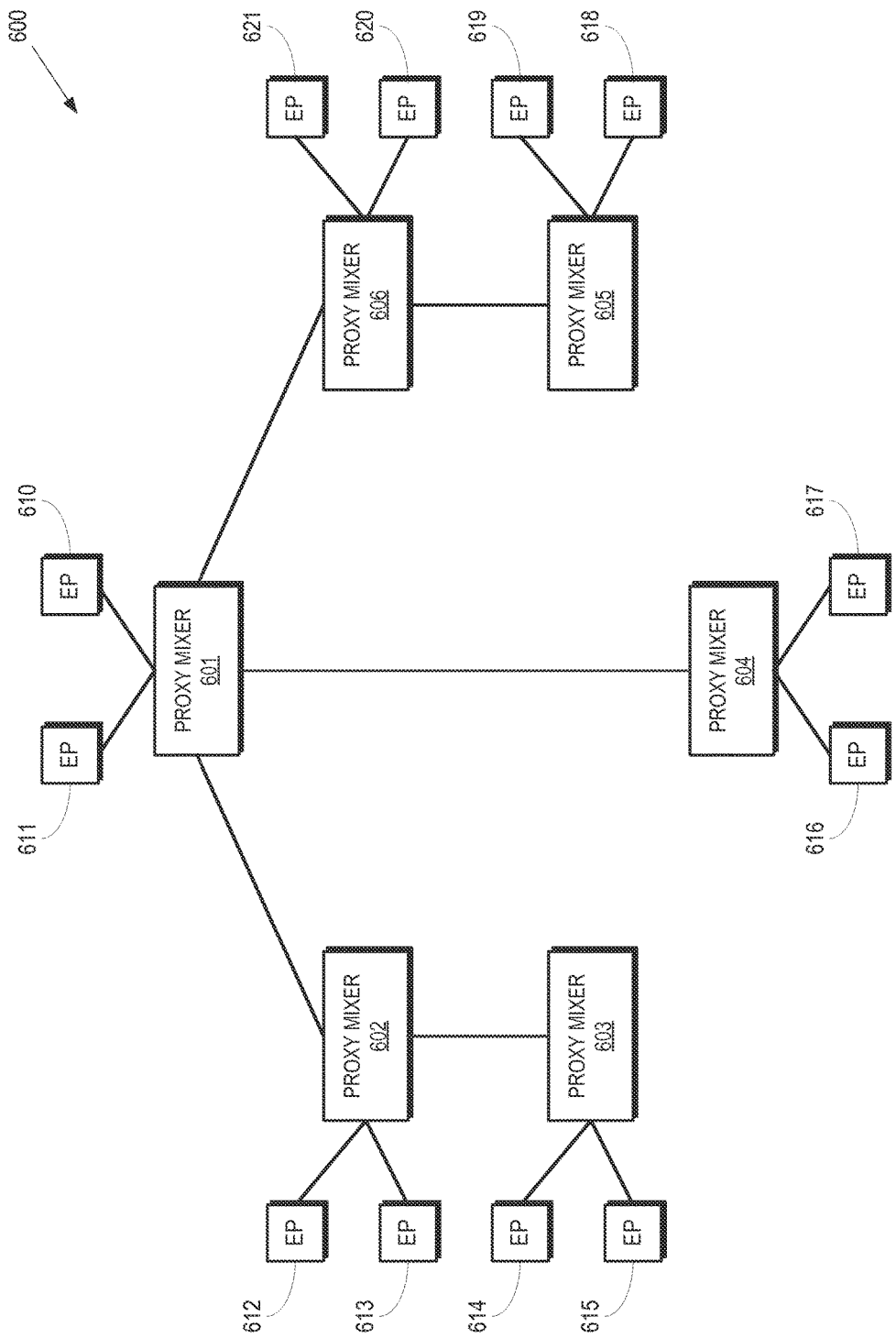
FIG. 6 is a block diagram of a communication system that includes proxy mixers interconnected in a tree hierarchy according to some embodiments.

FIG. 6 is a block diagram of a communication system 600 that includes proxy mixers interconnected in a tree hierarchy according to some embodiments. The communication system 600 includes the proxy mixers 601, 602, 603, 604, 605, 606 (referred to collectively as "the proxy mixers 601-606") that are associated with endpoints 610, 611, 612, 613, 614, 615, 616, 617, 618, 619, 620, 621 (collectively referred to herein as "the endpoints 610-621"). As discussed herein, each proxy mixer 601-606 receives media streams, composite streams, and requests for media streams or composite streams from its associated endpoints 610-621 or the other proxy mixers 601-606. The proxy mixers 601-606 also transmit media streams, composite streams, and requests for media streams or composite streams to its associated endpoints 610-621 or the other proxy mixers 601-606. The proxy mixers 601-606 can form aggregate quality metrics and perform transcoding as necessary.

The communication system 600 differs from the communication system 500 shown in FIG. 5 because the proxy mixers 601-606 are interconnected in a tree hierarchy in which there is only one communication path between any two of the proxy mixers 601-606. Consequently, there is only one communication path between any two of the endpoints 610-621. For example, the only communication path between the endpoint 610 and the endpoint 618 is via the proxy mixers 601, 606, 605. In the illustrated embodiment, each of the proxy mixers 601-606 acts as the root of its own tree. The trees that are rooted at the proxy mixer 601-606 share the same set of edges between the tree nodes. The edges define the parent-child relations between the proxy mixers 601-606 for the different trees. For example, in the tree rooted at the proxy mixer 601, the proxy mixers 602, 604, 606 are children of the proxy mixer 601, the proxy mixer 603 is a child of the proxy mixer 602, and the proxy mixer 605 is a child of the proxy mixer 606. For another example, in a tree rooted at the proxy mixer 604, the proxy mixer 601 is a child of the proxy mixer 604, the proxy mixers 602, 606 are children of the proxy mixer 601, the proxy mixer 603 is a child of the proxy mixer 602, and the proxy mixer 605 is a child of the proxy mixer 606.

Some embodiments of the communication system 600 employ last-stage mixing so that media streams are transcoded at proxy mixers 601-606 along the communication path from the endpoint 610-621 that generates the media stream to the endpoint 610-621 that request the media stream. The proxy mixers 601-606 associated with the endpoints 610-621 that provide the media streams generate media streams that satisfy the requested aggregate quality metrics for the other proxy mixers 601-606 in the system. Each media stream is then transmitted down the distribution tree that is rooted at the proxy mixer associated with the endpoint that generated the media stream. As the media stream passes through each proxy mixer 601-606 on the tree, transcoding functions are applied to generate a media stream that satisfies the requested aggregate quality metric of the proxy mixers 601-606 that are children of the node that is performing the transcoding. The transcoding process can be repeated for each level of the tree hierarchy, thereby ensuring that the media streams are transmitted between the proxy mixers 601-606 using the minimum bandwidth needed to satisfy the requested quality metrics for each of the endpoints 610-621. Once the media streams reach a destination proxy mixer 601-606 that is responsible for distributing media streams to its associated endpoints, the destination proxy mixer 601-606 may further transcode the media stream to fit the quality metrics requested by the individual endpoints 610-621. Each destination proxy mixer 601-606 combines the transcoded media streams received from the other proxy mixers 601-606 to provide complete compositions to its associated endpoints 610-621.

Some embodiments of the communication system 600 employ early-stage mixing. Transcoding is performed at the proxy mixers 601-606 of the endpoints 610-621 that generate a requested media stream. Each of the proxy mixers 601-606 combines the transcoded media streams to generate local composite streams that satisfy the requested aggregate quality metrics for all of the child proxy mixers 601-606 in the corresponding tree hierarchy. The local composite streams are sent down the distribution tree to child proxy mixers 601-606. As the local composite stream passes through each proxy mixer 601-606 in the distribution tree, transcoding is applied to generate a local composite stream that satisfies the requested aggregate quality metrics for the proxy mixers 601-606 that form the subtree rooted at the current mixer node. This process is repeated at each level of the tree hierarchy until the local composite stream reaches the proxy mixer 601-606 that is responsible for providing the composite streams to one or more endpoints 610-621. The destination proxy mixer 601-606 may further transcode the local composite streams to generate the composite stream that satisfies the quality metrics requested by the individual endpoints 610-621.

The number of interconnections in the tree hierarchy of the communication system 600 scales linearly with the number of proxy mixers 601-606 and consequently the tree hierarchy may be scalable to large numbers of proxy mixers 601-606. However, latency for communication between the proxy mixers 601-606 may be increased because messages may need to travel along many edges between the nodes in the tree hierarchy. In some embodiments, the tree hierarchy of the communication system 600 may be combined with the mesh topology of the system 500 shown in FIG. 5. Furthermore, some embodiments of the communication systems 500, 600 shown in FIGS. 5 and 6 may implement combinations of early-stage mixing and last-stage mixing.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
  receiving, at a first proxy mixer, at least one first request to provide at least one first media stream to at least one first endpoint, wherein the at least one first media stream is generated by at least one second endpoint, and wherein the at least one first request indicates at least one first quality metric for the at least one first media stream;
  providing, from the first proxy mixer, at least one second request for the at least one second endpoint to generate the at least one first media stream at an aggregate quality metric that equals a highest quality metric of the at least one first quality metric; and transmitting, from the first proxy mixer, the at least one first media stream towards the at least one first endpoint.

2. The method of claim 1, wherein receiving the at least one first request from the at least one first endpoint comprises receiving a plurality of first requests from a plurality of first endpoints for the at least one first media stream, and wherein the plurality of first requests indicate a plurality of first quality metrics.

3. The method of claim 2, further comprising:
determining, at the first proxy mixer, the aggregate quality metric as the highest quality metric of the plurality of first quality metrics.

4. The method of claim 3, further comprising:
receiving, at the first proxy mixer from the at least one second endpoint or at least one second proxy mixer associated with the at least one second endpoint, the at least one first media stream at the aggregate quality metric.

5. The method of claim 4, wherein receiving the at least one first media stream from the at least one second proxy mixer comprises receiving the at least one first media stream from the at least one second proxy mixer that is interconnected with the first proxy mixer in at least one of a mesh topology or a tree hierarchy.

6. The method of claim 4, wherein transmitting the at least one first media stream towards the at least one first endpoint comprises transcoding the at least one first media stream from the aggregate quality metric to the plurality of first quality metrics and providing the transcoded first media streams to the corresponding first endpoints.

7. The method of claim 2, further comprising:
receiving, at the first proxy mixer, a third request for at least one second media stream generated by the at least one first endpoint and at least one indication of at least one second quality metric for the at least one second media stream.

8. The method of claim 7, further comprising:
providing, from the first proxy mixer, a fourth request for the at least one first endpoint to generate the at least one second media stream using the at least one second quality metric.

9. The method of claim 8, further comprising:
providing, from the first proxy mixer, the at least one second media stream in response to the third request.

10. An apparatus, comprising:
a transceiver configured to:
receive at least one first request to provide at least one first media stream to at least one first endpoint, wherein the at least one first media stream is generated by at least one second endpoint, and wherein the at least one first request indicates at least one first quality metric for the at least one first media stream;
provide at least one second request for the at least one second endpoint to generate the at least one first media stream at an aggregate quality metric that equals a highest quality metric of the at least one first quality metric; and
transmit the at least one first media stream towards the at least one first endpoint.

11. The apparatus of claim 10, wherein the transceiver is configured to receive a plurality of first requests from a plurality of first endpoints for the at least one first media stream, and wherein the plurality of first requests indicate a plurality of first quality metrics.

12. The apparatus of claim 11, further comprising:
a processor configured to determine the aggregate quality metric as the highest quality metric of the plurality of first quality metrics.

13. The apparatus of claim 12, wherein the transceiver is configured to receive, from the at least one second endpoint or at least one proxy mixer associated with the at least one second endpoint, the at least one first media stream at the aggregate quality metric.

14. The apparatus of claim 13, wherein the transceiver is configured to receive the at least one first media stream from the at least one proxy mixer that is interconnected with the transceiver in at least one of a mesh topology or a tree hierarchy.

15. The apparatus of claim 13, wherein the processor is configured to transcode the at least one first media stream from the aggregate quality metric to the plurality of first quality metrics, and wherein the transceiver is configured to provide the transcoded first media streams to the corresponding first endpoints.

16. The apparatus of claim 11, wherein the transceiver is configured to receive a third request for at least one second media stream generated by the at least one first endpoint and at least one indication of at least one second quality metric for the at least one second media stream.

17. The apparatus of claim 16, wherein the transceiver is configured to provide at least one fourth request for the at least one first endpoint to generate the at least one second media stream using the at least one second quality metric.

18. The apparatus of claim 17, wherein the transceiver is configured to provide the at least one second media stream in response to the third request.

19. A method, comprising:
providing, from a first endpoint, a first request for a first proxy mixer to provide at least one first media stream, wherein the request indicates at least one first quality metric for the at least one first media stream, and wherein the at least one first media stream is generated by at least one second endpoint; and
receiving, at the first endpoint, the at least one first media stream from the first proxy mixer at the at least one first quality metric in response to providing the first request.

20. The method of claim 19, further comprising:
receiving, at the first endpoint, a second request for the first endpoint to generate at least one second media stream based on at least one second quality metric; and
providing, from the first endpoint, the at least one second media stream generated based on the at least one second quality metric.

* * * * *